United States Patent [19]

Noguchi et al.

[11] Patent Number: 5,169,442
[45] Date of Patent: Dec. 8, 1992

[54] BLUISH GREEN PIGMENT AND METHOD OF PREPARING THE SAME

[75] Inventors: Tamio Noguchi; Yumiko Waragai, both of Iwaki, Japan

[73] Assignee: Merck Patent Gesellschaft mit Beschraenkter Haftung, Darmstadt, Fed. Rep. of Germany

[21] Appl. No.: 705,000

[22] Filed: May 24, 1991

[30] Foreign Application Priority Data

May 24, 1990 [JP] Japan ................................. 2-132724

[51] Int. Cl.⁵ ............................................. C04B 14/20
[52] U.S. Cl. .................................... 106/417; 106/415; 106/416; 424/63; 424/69; 424/401; 428/363; 428/379
[58] Field of Search ........................ 424/401, 63, 69; 106/415, 416, 417; 428/363, 379

[56] References Cited

U.S. PATENT DOCUMENTS 4,603,047 7/1986 Watanabe et al. ................... 424/63
4,772,331 9/1988 Noguchi et al. ..................... 106/417

FOREIGN PATENT DOCUMENTS 63-265966 11/1988 Japan .

Primary Examiner—Thurman K. Page
Assistant Examiner—Robert H. Harrison
Attorney, Agent, or Firm—Millen, White, Zelano and Branigan

[57] ABSTRACT

The invention relates to a bluish green pigment comprising a flaky fine powder as a substrate, in which the substrate is coated with a metal oxide composite composed of oxides of magnesium, calcium, cobalt and titanium in a coated amount of from 5 to 70% by weight on the basis of the total pigment.

6 Claims, No Drawings

BLUISH GREEN PIGMENT AND METHOD OF PREPARING THE SAME

BACKGROUND OF THE INVENTION

The present invention relates to a bluish green pigment as coated with a metal oxide composite, which has a good color tone with excellent saturation and lightness and has high chemical safety, as well as to a method of preparing the same. The object of the present invention is to provide a bluish green pigment which is useful as a colorant for cosmetic materials, coating compositions, inks and plastics.

Green or bluish green flaky pigments, prepared by coating a blue or green pigment such as prussian blue or ultramarine pigment or chromium oxide on the surface of a flaky mica or a flaky mica as coated with a titanium oxide having an interference color of blue or green, as well as a colored flaky powder prepared by coating a metal oxide composite comprising oxides of titanium, cobalt and lithium on the surface of a flaky powder have been known.

Also known is a cobalt (II) ion-containing green pigment, specifically a spinel type titanium pigment such as cobalt titanate ($CO_2TiO_4$-$CoTiO_5$), which is obtained by blending a cobalt oxide powder and a titanium oxide powder and then firing the resulting blend at a high temperature of 900° C. or higher. Additionally, green pigments with improved color tone such as cobalt lithium titanate ($Li_2CoTi_3O_8$) and a composition of $CaTiO_3$—$CoTiO_3$—$TiO_2$ are also known.

A bluish green pigment, having a chemical formula of $XCoO(2-X)MgOTiO_2$ (X is from 0.8 to 1.0; and the main wavelength $\lambda_p$ is from 491 to 500 μm) is known, and is prepared by reacting magnesium oxide and titanium oxide at a high temperature of about 1300° C. to synthesize magnesium titanate ($MgTiO_3$) having a spinel structure and doping cobalt oxide to the titanate by firing.

It is not possible to produce this pigment on a flaky substrate, however, such as in a process wherein a substrate of a flaky kaolin, talc, sericite or mica is coated with a cobalt (II) ion-containing spinel type titanium pigment, the flaky substrate is blended with cobalt oxide, magnesium oxide and titanium oxide and then fired at a high temperature. In this process, the flaky substrate and the oxides are solidified by firing, and a pigment is not obtained.

A green pigment prepared by coating a flaky powder with a metal oxide composite comprising oxides of titanium, cobalt and lithium is known (Japanese Patent Application Laid-Open No. 63-043963). However, lithium is an extremely scarce natural resource and is therefore high-priced as an industrial raw material. Additionally, the process of producing the pigment comprises complicated wet-process steps and dry-process steps where a titanium oxide hydrate and a cobalt oxide hydrate are precipitated on the surface of the flaky powder by a wet-process, then the thus precipitate-coated product is washed with water and dried to give a powder and the resulting powder is blended with a lithium compound and then fired at a high temperature. Consequently, the pigment is inevitably high-priced.

On the other hand, the above-mentioned pigment as prepared by coating a prussian blue on the surface of a titanium oxide-coated mica has some drawbacks that the coated prussian blue fades in an alkaline solution generating dicyan or is decomposed to fade under heat at a temperature of 200° to 300° C. Similarly, the pigment as coated with ultramarine has a problem of chemical stability, since it generates hydrogen sulfide gas in an acidic solution. The use of the other pigment as coated with chromium oxide is limited currently since chromium is said to have a problem of safety.

SUMMARY OF THE INVENTION

The present inventors earnestly and repeatedly studied so as to overcome the above-mentioned drawbacks and problems in the prior art and, as a result, have found that a bluish green pigment having high intensity and saturation and having good safety and stability can be obtained by a simple operation and inexpensively, by coating a substrate of a flaky fine powder with a metal oxide composite comprising oxides of titanium, cobalt, magnesium and calcium. The present invention has been completed on the basis of such finding.

Specifically, the present invention provides a bluish green pigment comprising a flaky fine powder as a substrate, in which the substrate is coated with a metal oxide composite composed of oxides of magnesium, calcium, cobalt and titanium in a coated amount of from 5 to 70% by weight on the basis of the total pigment. It further provides a method of preparing the bluish green pigment, where an aqueous solution containing a magnesium salt, a calcium salt, a cobalt salt and a titanium salt dissolved therein and an aqueous basic solution are added to a suspension of a flaky fine powder as suspended in water with heating and stirring whereby hydroxides and oxide hydrates of the said metals and optionally carbonates of calcium are co-precipitated on the surface of the flaky fine powder substrate, and the resulting product is taken out by filtration, washed with water and fired.

The present invention will be explained in detail hereunder.

The present pigments all are based on a flaky powder substrate, whereas the cobalt-containing pigments discussed in the "Background" section are conventional, carrier-free pigments.

First, the method of preparing a bluish green pigment of the present invention will be explained in detail. A flaky powder of mica, talc, kaolin, sericite or synthetic mica is suspended in water; an aqueous solution containing a magnesium salt, a calcium salt, a cobalt salt and a titanium salt dissolved therein, or an aqueous solution containing metal ions of magnesium(II), calcium(II), cobalt(II) and titanium(IV), and an aqueous basic solution are added to the suspension with heating and stirring, whereupon the pH value of the suspension is adjusted to be within the range of from 1.0 to 2.5 and a titanium oxide hydrate containing a small amount of magnesium(II) ion, calcium(II) ion and cobalt(II) ion is coated on the surface of the flaky fine powder substrate; then an aqueous basic solution is gradually added to the suspension so that the pH value of the suspension is made to be within the range of from 2.5 to 7.0; and an aqueous basic solution is further added thereto so that the pH value comes to within the range of from 7.0 to 10.0, whereby cobalt oxide hydrate, calcium hydroxide and magnesium hydroxide are co-precipitated on the surface of the said titanium oxide hydrate-coated flaky substrate to thereby completely coat the surface of the flaky fine powder substrate with cobalt(II) ion, as a cobalt oxide hydrate.

As the above-mentioned aqueous basic solution, an aqueous solution containing an alkali metal carbonate or urea may be used whereby carbonates such as cobalt carbonate, calcium carbonate and magnesium carbonate may be co-precipitated on the surface of the said titanium oxide hydrate-coated flaky substrate.

In the next step, the flaky substrate as coated with co-precipitates of hydroxides and oxide hydrates of the above-mentioned metals and optionally carbonates is removed from solution by filtration, washed with water and fired, whereby an intended bluish green pigment as coated with a metal oxide composite comprising oxides of magnesium, calcium, cobalt and titanium is obtained efficiently.

As examples of the flaky fine powder which is used as a raw material in preparing the pigment of the present invention, there are mentioned clay minerals such as kaolin, talc, sericite, mica and pyrophyllite, as well as synthetic mica. Additionally, a titanium oxide-coated mica pigment or an iron oxide-coated mica pigment which are generally sold as commercial products may directly be used as the raw material in the present invention. In this case, titanium ions need not be present in the salt solution; the other metals diffuse into the existing titanium layer to form the composite upon firing.

As examples of the above-mentioned magnesium salt, there are mentioned magnesium chloride, magnesium bromide, magnesium sulfate and magnesium nitrate; as those of the calcium salt, there are calcium chloride and calcium nitrate; as those of the cobalt salt, there are cobalt chloride, cobalt sulfate and cobalt nitrate, and as those of the titanium salt, there are titanium tetrachloride and titanyl sulfate. These inorganic salts of metals are preferably used in the present invention.

As other examples of the magnesium salt, calcium salt, cobalt salt and titanium salt, there are further mentioned alkoxides such as titanium tetrapropoxide $Ti(C_3H_7O)_4$, as well as salts of metals with organic acids. Examples of the above-mentioned basic compound, which is employed for pH-adjustment in the step of coating the metal ions on the surface of the flaky substrate as their hydroxides or oxide hydrates, are hydroxides such as sodium hydroxide, potassium hydroxide and ammonium hydroxide, carbonates such as sodium carbonate, potassium carbonate and ammonium carbonate, as well as hydrogencarbonates thereof. Additionally, urea which is hydrolyzed by heating in an aqueous solution to give ammonia and carbon dioxide may also be referred to. In particular, where urea is used, carbon dioxide to be generated by hydrolysis is bonded to calcium(II) ion to give calcium carbonate and the carbonate is co-precipitated on the surface of the substrate along with other cobalt oxide hydrate, magnesium hydroxide and titanium oxide hydrate. In this case, a pigment having a better dispersibility can be obtained.

Where a commercial product of titanium dioxide-coated mica pigment or iron oxide-coated pearly mica pigment (for example, Iriodin, Timiron or Colorona by Merck Co.) is used as the flaky fine powder substrate, a two-coloring pearly pigment which is new and which has a color hue variable in accordance with the reflected light or transmitted light as imparted thereto can be obtained. For instance, a titanium dioxide-coated mica pigment having a red color to reflected light and a green color to transmitted light is coated with the above-mentioned metal oxide composite, the resulting pigment has a bluish red color to reflected light and an yellowish green color to transmitted light.

The bluish green pigment of the present invention may have various color tones which vary in a broad range of from a bluish green color to a green color in accordance with selection and combination of the conditions of the grain form and/or size of oxides of titanium, cobalt, magnesium and calcium to be coated on the surface of the flaky fine powder substrate, the amount of the metal oxide composite coated, as well as the heating temperature and the heating tim in preparing the pigment. Production of a desired color may be achieved by routine experimentation, e.g., in accordance with the examples.

The amount of the above-mentioned metal oxide composite to be coated on the surface of the flaky substrate is preferably from 5 to 70% by weight, more preferably from 10 to 60% by weight, to the whole pigment. If the coated amount is less than 5% by weight, a pigment having a good saturation is generally not obtained. On the other hand, if the coating is more than 70% by weight, coagulated solids tend to form during preparation and a pigment with a good quality is generally not obtained.

After the surface of the above-mentioned flaky substrate has been coated with hydroxides and oxide hydrates of titanium, cobalt, magnesium and calcium optionally along with carbonates of the metals, the thus coated substrate is fired to finally form oxides of the metals on the substrate, whereupon the firing temperature is from 500° to 1300° C., preferably 700° to 1000° C., and the firing time is 0.5 to 5.0 hours.

Under the above-mentioned condition, oxides of titanium, cobalt, magnesium and calcium form a composite oxide of the so-called "solid solution" form. In addition, oxides of the respective metals per se may also be present along with the composite oxide. In the present invention, the term "metal oxide composite" includes all of these cases.

The composition of the metal oxide composite in the bluish green pigment of the present invention generally comprises from 0.3 to 1.0 mole of cobalt oxide, from 0.05 to 0.20 mole of magnesium oxide and from 0.05 to 0.20 mole of calcium oxide based on one mole of titanium oxide. Accordingly, the proportion of the raw materials to be reacted is preferably selected in the same proportions so as to produce this composition.

The bluish green pigment of the present invention is obtained by the method mentioned in detail in the above. As the pigment has an excellent color tone with good intensity and saturation and is non-toxic and additionally has various excellent characteristics of light fastness, heat resistance and chemical resistance, it is an industrially useful and advantageous colorant for cosmetic materials, coating compositions, plastic products, ink products and ceramic products.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application Japanese Patent Appln. No. 0/132724,

EXAMPLES

Example 1

A suspension prepared by adding 120 g of a fine muscovite powder having a grain size of from 10 to 60 microns to 1200 ml of water was heated at 95° C., and 295.5 g of aqueous 32 wt. % titanium tetrachloride solution and an aqueous solution prepared by dissolving 31.6 g of cobalt chloride hexahydrate, 5 g of magnesium chloride hexahydrate and 3.7 g of calcium chloride dihydrate were added to the suspension with adjusting the pH value of the suspension to fall within the range of from 1.0 to 2.5 with an aqueous 10 wt. % sodium hydroxide solution, with heating and stirring, over a period of 7 hours. After all the above-mentioned aqueous metal salt solutions were added, the pH value of the suspension was adjusted to fall within the range of from 7 to 10 by adding an aqueous 10 wt. % sodium hydroxide solution thereto, whereby hydroxides and oxide hydrates of the metals were co-precipitated on the surface of the fine muscovite powder. The resulting product was then taken out by filtration, washed with water and dried at 105° to 110° C. for 8 hours. Next, the product was fired at 800° C. for one hour to obtain a bluish green pigment in which the surface of the fine muscovite powder was coated with the metal oxide composite.

Example 2

A suspension prepared by adding 120 g of a fine sericite powder having a grain size of from 1 to 20 microns to 1200 ml of water was heated to 95° C., and 295.5 g of aqueous 32 wt. % titanium tetrachloride solution and an aqueous solution prepared by dissolving 31.6 g of cobalt chloride hexahydrate, 5 g of magnesium chloride hexahydrate and 3.7 of calcium chloride dihydrate in 3000 ml of water were added to the suspension with adjusting the pH value of the suspension to fall within the range of from 1.0 to 2.5 with an aqueous 10 wt. % sodium hydroxide solution, with heating and stirring, over a period of 7 hours. After all the above-mentioned aqueous metal salt solutions were added, the pH value of the suspension was adjusted to fall within the range of from 7 to 10 by further adding an aqueous 10 wt. % sodium hydroxide solution thereto, whereby hydroxides and oxide hydrates of the metals were co-precipitated on the surface of the fine sericite powder. The resulting product was then taken out by filtration, washed with water and dried at 105 to 110° C. for 8 hours. Next, the product was fired at 800° C. for one hour to obtain a bluish green pigment in which the surface of the fine sericite powder was coated with the metal oxide composite.

Example 3

A suspension prepared by adding 70 g of a fine synthetic mica powder having a grain size of from 1 to 70 microns to 700 ml of water was heated at 95° C., and 110 go of an aqueous 32 wt. % titanium tetrachloride solution and an aqueous solution prepared by dissolving 10 g of cobalt chloride hexahydrate, 2 g of magnesium chloride hexahydrate and 2 g of calcium chloride hexahydrate in 150 ml of water were added to the resulting suspension with adjusting the pH value of the suspension to fall within the range of from 1.0 to 2.5 with an aqueous 10 wt. % sodium hydroxide solution, with heating and stirring, over a period of 2 hours. After all the above-mentioned aqueous metal salt solutions were added, the pH value of the suspension was adjusted to fall within the range of from 7 to 10 by further adding an aqueous 10 wt. % sodium hydroxide solution thereto, whereby hydroxides and oxide hydrates of the metals were co-precipitated on the surface of the fine talc powder. The resulting product was taken out by filtration, washed with water and dried at 105° to 110° C. for 8 hours. Next, the product was fired at 800° C. for one hour to obtain bluish green pigment in which the surface of the fine talc powder was coated with the metal oxide composite.

Example 5

A suspension prepared by adding 120 g of a fine kaolin powder (K. clay, product by Shokosan Mining Industry) having a grain size of 12 microns or less to 1200 ml of water was heated at 95° C., and 98.5 g of an aqueous 32 wt. % titanium tetrachloride solution and an aqueous solution prepared by dissolving 31.6 g of cobalt chloride hexahydrate, 3.5 g of magnesium chloride hexahydrate and 2.5 g of calcium chloride dihydrate in 1000 ml of water were added to the suspension with adjusting the pH value of the suspension to fall within the range of from 1.0 to 2.5 with an aqueous 10 wt. % sodium hydroxide solution, with heating and stirring, over a period of 2 hours. After all the above-mentioned and aqueous metal salt solutions were added, the pH value of the suspension was adjusted to fall within the range of from 7 to 10 by further adding an aqueous 10 wt. % sodium hydroxide solution, whereby hydroxides and oxide hydrates of the metals were co-precipitated on the surface of the fine kaolin powder. The resulting product was taken out by filtration, washed with water and dried at 105° to 110° C. for 8 hours. Next, the product was fired at 850° C. for one hour to obtain a bluish green pigment in which the surface of the fine kaolin powder was coated with the metal oxide composite.

Example 6

A suspension prepared by adding 120 g of a titanium oxide-coated fine mica powder having a blue-reflecting color and an yellow-transmitting color (Iriodin 225, product by Merck Co.) to 1200 ml of water was heated at 95° C., and 98.5 g of an aqueous 32 wt. % titanium tetrachloride solution and an aqueous solution prepared by dissolving 31.6 g of cobalt chloride hexahydrate, 3.5 g of magnesium chloride hexahydrate and 2.5 g of calcium chloride dehydrate in 100 ml of water were added to the suspension with adjusting the pH value of the suspension to fall within the range of from 1.0 to 2.5 with an aqueous 10 wt. % sodium hydroxide solution, with heating and stirring, over a period of 2 hours. After all the above-mentioned aqueous metal salt solutions were added, the pH value of the suspension was adjusted to fall within the range of from 7 to 10 by further adding an aqueous 10 wt. % sodium hydroxide solution thereto, whereby hydroxides and oxide hydrates of the metals were co-precipitated on the surface of the titanium oxide-coated fine mica powder. The resulting product was taken out by filtration, washed with water and dried at 105° to 110° C. for 8 hours. Next, the product was fired at 850° C. for one hour to obtain a brilliant bluish green pigment in which the surface of the titanium oxide-coated fine mica powder was coated with the metal oxide composite. The pigment thus obtained had a bluish green-reflecting color with a high saturation and had an yellowish red-transmitting color.

Example 7

A suspension prepared by adding 120 g of a titanium oxide-coated fine mica powder having a gold-reflecting color and a blue-transmitting color (Iriodin 205, product by Merck Co.) to 1200 ml of water was heated at 95° C., and 98.5 g of an aqueous 32 wt. % titanium tetrachloride solution and an aqueous solution prepared by dissolving 31.6 g of cobalt chloride hexahydrate, 3.5 g of magnesium chloride hexahydrate and 2.5 g of calcium chloride dehydrate in 100 ml of water were added to the suspension with adjusting the pH value of the suspension to fall within the range of from 1.0 to 2.5 with an aqueous 10 wt. % sodium hydroxide solution, with heating and stirring, over a period of 2 hours. After all the above-mentioned aqueous metal salt solutions were added, the pH value of the suspension was adjusted to fall within the range of from 7 to 10 by further adding an aqueous 10 wt. % sodium hydroxide solution thereto, whereby hydroxides and oxide hydrates of the metals were co-precipitate on the surface of the titanium oxide-coated fine mica powder. The resulting product was taken out by filtration, washed with water and dried at 105° to 110° C. for 8 hours. Next, the product was fired at 850°0 C. for one hour to obtain a brilliant bluish green pigment in which the surface of the iron oxide-coated fine mica powder was coated with the metal oxide composite. The pigment thus obtained had a reddish violet-reflecting color with a high saturation and had an yellowish green-transmitting color.

Example 8

A suspension prepared by adding 60 g of an iron oxide-coated fine mica powder (Iriodin 500, product by Merck Co.) to 600 ml of water was heated at 95° C., and 100 g of an aqueous 32 wt. % titanium tetrachloride solution and an aqueous solution prepared by dissolving 12 g of cobalt chloride hexahydrate, 1.6 g, of magnesium chloride hexahydrate and 1.2 g of calcium chloride dihydrate in 100 ml of water were added to the suspension with adjusting the pH value of the suspension to fall within the range of from 1.0 to 2.5 with an aqueous 10 wt. % sodium hydroxide solution, with heating and stirring, over a period of 2 hours. After all the above-mentioned aqueous metal salt solutions were added, the pH value of the suspension was adjusted to fall within the range of from 7 to 10 by further adding an aqueous 10 wt. % sodium hydroxide solution thereto, whereby hydroxides and oxide hydrates of the metals co-precipitated on the surface of the iron oxide-coated fine mica powder. The resulting product was taken out by filtration, washed with water and dried at 105° to 110° C. for 8 hours. Next, the product was fired at 850° C. for one hour to obtain a bluish green pigment in which the surface of the iron oxide-coated fine mica powder was coated with the metal oxide composite. The color of the pigment thus obtained was more bluish green than the color hue of the iron oxide-coated fine mica powder used as the starting material.

Example 9

A suspension prepared by adding 120 g of a titanium oxide-coated fine mica powder having a blue-reflecting color and an yellow-transmitting color (Iriodin 225, product by Merck Co.) to 1200 ml of water was heated at 95° C., and 98.5 g of an aqueous 32 wt. % titanium tetrachloride solution and an aqueous solution prepared by dissolving 31.6 g of cobalt chloride hexahydrate, 3.5 g of magnesium chloride hexahydrate and 2.5 g of calcium chloride dehydrate in 100 ml of water were added to the suspension with adjusting the pH value of the suspension to fall within the range of from 1.0 to 2.5 with an aqueous 30 wt. % potassium carbonate solution, with heating and stirring, over a period of 2 hours. After all the above-mentioned aqueous metal salt solutions were added, the pH value of the suspension was adjusted to fall within the range of from 7 to 10 by further adding coated fine mica powder. The resulting product was taken out by filtration, washed with water and dried at 105° to 110° C. for 8 hours. Next, the product was fired at 850° C. for one hour to obtain a brilliant bluish green pigment in which the surface of the titanium oxide-coated fine mica powder was coated with the metal oxide composite. The pigment thus obtained had a bluish green-reflecting color with a high saturation and had a yellowish red-transmitting color.

Example 10

A suspension prepared by adding 80 g of a titanium oxide-coated fine mica powder having a blue-reflecting color and a yellow-transmitting color (Iriodin 225, product by Merck Co.) to 800 ml of water was heated at 95° C., and 45 g of urea, 65.8 g of an aqueous 32 wt. % titanium chloride solution and a solution prepared by dissolving 8 g of cobalt chloride hexahydrate, 8 g of magnesium chloride hexahydrate and 12 g of calcium chloride dihydrate in 400 ml of water were added to the suspension with adjusting the pH value of the suspension to fall within the range of from 1.0 to 2.5 with an aqueous 10 wt. % sodium hydroxide solution, with heating and stirring, over a period of 40 minutes. After all the above-mentioned aqueous salt solutions were added, the pH value of the suspension was adjusted to fall within the range of from 7 to 10 by further adding an aqueous 10 wt. % sodium hydroxide solution thereto, whereby hydroxides, oxide hydrates and carbonates of the metals were co-precipitated on the surface of the titanium oxide-coated fine mica powder. The resulting product was taken out by filtration, washed with water and dried at 105° to 110° C. for 8 hours. Next, the product was fired at 800° C. for one hour to obtain a brilliant bluish green pigment in which the surface of the titanium oxide-coated fine mica powder was coated with the metal oxide composite. The pigment thus obtained had a bluish green-reflecting color with a high saturation and had a yellowish red-transmitting color.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A bluish green pigment comprising a substrate of a flaky fine powder coated with a metal oxide composite comprising 0.3 to 1.0 mole cobalt oxide, 0.05 to 0.2 mole magnesium oxide and 0.05 to 0.20 mole calcium oxide, per mole of titanium oxide, said metal oxide composite being produced by simultaneous precipitation of the metals onto the substrate.

2. A pigment according to claim 1, wherein the composite is present in an amount of about 5 to 70% by weight on the basis of the total pigment.

3. A pigment according to claim 1, wherein the substrate is mica, talc, kallin, sericite or synthetic mica.

4. A pigment according to claim 1, wherein substrate is a flaky fine powdered mica coated with titanium oxide.

5. A pigment according to claim 1, wherein the substrate is a flaky fine powdered mica coated with an iron oxide hydrate or iron oxide.

6. In a cosmetic composition comprising a cosmetically acceptable carrier and a pigment, the improvement wherein the pigment is one of claim 1.

* * * * *